United States Patent [19]
Shi et al.

[11] Patent Number: 5,593,788
[45] Date of Patent: Jan. 14, 1997

[54] ORGANIC ELECTROLUMINESCENT DEVICES WITH HIGH OPERATIONAL STABILITY

[75] Inventors: Jianmin Shi, Webster; Ching W. Tang, Rochester, both of N.Y.

[73] Assignee: Eastman Kodak Company, Rochester, N.Y.

[21] Appl. No.: 637,987

[22] Filed: Apr. 25, 1996

[51] Int. Cl.$^6$ .............................. H05B 33/00; H05B 33/14
[52] U.S. Cl. ..................... 428/690; 428/691; 428/917; 313/504
[58] Field of Search ................ 313/504; 428/690, 428/691, 917

[56] References Cited

U.S. PATENT DOCUMENTS

| | | | |
|---|---|---|---|
| 4,769,292 | 9/1998 | Tang et al. | 428/917 |
| 5,227,252 | 7/1993 | Murayama et al. | 428/690 |

*Primary Examiner*—Charles Nold
*Attorney, Agent, or Firm*—Raymond L. Owens

[57] ABSTRACT

An organic electroluminescent device of improved efficiency and operational stability has been disclosed. The device comprises of an anode and a cathode, and an organic electroluminescent element disposed between the anode and cathode. Characterized in the organic electroluminescent element is at least one fluorescent emitting layer containing a mixture of two or more materials. The mixture contains a quinacridone compound of the formula:

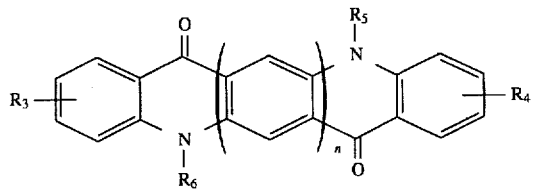

where $R_3$ and $R_4$ are independently alkyl, aryl, fused aryl or halogen; and $R_5$ and $R_6$ are independently alkyl, substituted alkyl, aryl, or substituted aryl; and n=0, 1, 2 or 3.

5 Claims, 2 Drawing Sheets

ORGANIC ELECTROLUMINESCENT DEVICES WITH HIGH OPERATIONAL STABILITY

CROSS REFERENCE TO RELATED APPLICATION

Reference is made to and priority claimed from U.S. Provisional application Ser. No. 60/004,508, filed 29 Sep. 1995, pending entitled ORGANIC ELECTROLUMINESCENT DEVICES WITH HIGH OPERATIONAL STABILITY.

FIELD OF THE INVENTION

This invention relates to organic electroluminescent devices (EL devices). More specifically, this invention relates to devices which emit light from a current conducting organic layer and have high operational stability.

BACKGROUND OF THE INVENTION

While organic EL devices have been known for about three decades, their performance limitations, mainly short operational life-time, have represented a barrier to many desirable applications. (For brevity, EL, the common acronym for electroluminescent, is sometimes substituted.)

Representative of earlier organic EL devices are Gurnee et al U.S. Pat. No. 3,172,862, issued Mar. 9, 1965; Gurnee U.S. Pat. No. 3,173,050, issued Mar. 9, 1965; Dresner, "Double Injection Electroluminescence in Anthracene", RCA Review, Vol. 30, pp. 322–334, 1969; and Dresner U.S. Pat. No. 3,710,167, issued Jan. 9, 1973. The organic emitting material was formed of a conjugated organic host material and a conjugated organic activating agent having condensed benzene rings. Naphthalene, anthracene, phenanthrene, pyrene, benzopyrene, chrysene, picene, carbazole, fluorene, biphenyl, terpheyls, quarterphenyls, triphenylene oxide, dihalobiphenyl, trans-stilbene, and 1,4-diphenylbutadiene were offered as examples of organic host materials. Anthracene, tetracene, and pentacene were named as examples of activating agents. The organic emitting material was present as a single layer having thicknesses above 1 mm.

The most recent discoveries in the art of organic EL device construction have resulted from EL device constructions with the organic luminescent medium consisting of two extremely thin layers (<1.0 micrometer in combined thickness) separating the anode and cathode, one specifically chosen to inject and transport holes and the other specifically chosen to inject and transport electrons and also acting as the organic luminescent zone of the device. The extremely thin organic luminescent medium offers reduced resistance, permitting higher current densities for a given level of electrical biasing. Since light emission is directly related to current density through the organic luminescent medium, the thin layers coupled with increased charge injection and transport efficiencies have allowed acceptable light emission levels (e.g. brightness levels capable of being visually detected in ambient light) to be achieved with low applied voltages in ranges compatible with integrated circuit drivers, such as field effect transistors.

For example, Tang U.S. Pat. No. 4,356,429 discloses an EL device formed of an organic luminescent medium consisting of a hole injecting and transporting layer containing a porphyrinic compound and an electron injecting and transporting layer also acting as the luminescent zone of the device.

A further improvement in such organic EL devices is taught by VanSlyke et al U.S. Pat. No. 4,539,507. VanSlyke et al realized a dramatic improvement in light emission by substituting for the hole injecting and transporting porphyrinic compound of Tang an aromatic tertiary amine layer.

The organic EL devices have been constructed of a variety of cathode materials. Early investigations employed alkali metals, since these are the lowest work function metals. Tang et al, U.S. Pat. No. 4,885,211 discloses an EL device requiring a low voltage to operate and which is comprised of a cathode formed of a plurality of metals other than alkali metals, at least one of which has a work function of less than 4 eV.

Commonly assigned VanSlyke et al U.S. Pat. No. 4,720,432 described an EL device using an improved multi-layer organic medium.

Further improvement in organic EL devices such as color, stability, efficiency and fabrication methods have been disclosed in U.S. Pat. Nos. 5,151,629; 5,150,006; 5,141,671; 5,073,446; 5,061,569; 5,059,862; 5,059,861; 5,047,687; 4,950,950; 4,769,292, 5,104,740; 5,227,252; 5,256,945; 5,069,975, and 5,122,711.

Specifically, Tang et al in U.S. Pat. No. 4,769,292 discloses that the EL device efficiency can be greatly improved by using an organic emitter layer which comprises of a host material and a small amount of dopant molecules. A preferred host material is an aluminum complex of 8-hydroxyquinoline, namely tris(8-hydroxyquinolinol) aluminum also commonly known as Alq. The dopant molecule is chosen from several classes of highly fluorescent molecules. Perferred examples are the coumarins, rhodamines. Following the teaching of Tang et al, Murayama et al discloses in U.S. Pat. No. 5,227,252 another class of molecules useful as dopant in the organic EL device, namely the quinacridone pigment of formula (I):

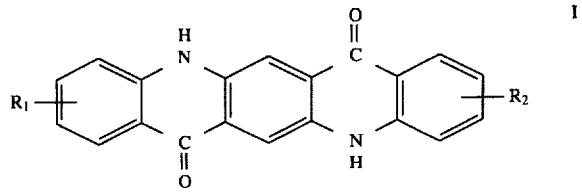

where $R_1$ and $R_2$ are independently hydrogen, methyl group or chlorine or the dehydro form the the quinacridone compound. When used with Alq as the host material, highly efficient organic EL device emitting in the green has been disclosed. However, the usefulness of quinacridone as described in formula (I) is limited because of the instability of the quinacridone molecule in EL operation.

SUMMARY OF THE INVENTION

It is an object of the present invention to provide an organic EL device with improved efficiency and operational stability.

This object is achieved in an organic EL device, comprising an anode and a cathode, and an organic EL device comprising an anode and a cathode, and an organic EL element disposed between the anode and cathode;

characterized in that the organic EL element has at least one fluorescent emitting layer containing a mixture of two or more materials:

the mixture contains a compound of the formula:

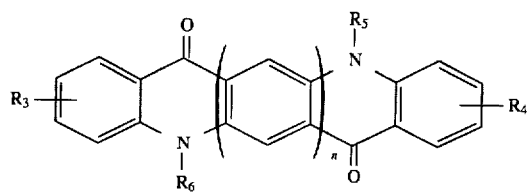

where $R_3$ and $R_4$ are independently alkyl, alkoxyl, substituted alkyl, aryl, fused aryl halogen; and $R_5$ and $R_6$ are independently alkyl, alkoxyl, substituted alkyl, aryl, or substituted aryl; and n=0,1, 2 or 3.

In accordance with the present invention, it is believed that the usefulness of quinacridone as described in formula (I) is limited because of the instability of the quinacridone molecule in EL operation. Specifically the presence of N—H and C=O bonds in the molecular structure may cause the formation of hydrogen bonds between neighboring quinacridone molecules. The formation of such a dimer molecules may gradually degrade the EL efficiency during operation because the dimer molecule is generally non-fluorescent and therefore provides a new non-radiative pathway for the dissipation the EL excitation energy. Hence, it is highly desirable to produce a variant of the acridone structure which will provide the organic EL device with enhanced efficiency and stability.

ADVANTAGES

It is an advantage of this invention that an organic EL device is provided with a quinacridone compound which has the advantages that were previously used but overcomes the problems discussed above.

BRIEF DESCRIPTION OF THE DRAWINGS

These and other advantages of this invention can be better appreciated by reference to the following detailed description considered in conjunction with the drawings in which.

DETAILED DESCRIPTION OF THE PREFERRED EMBODIMENTS

Figure 1:
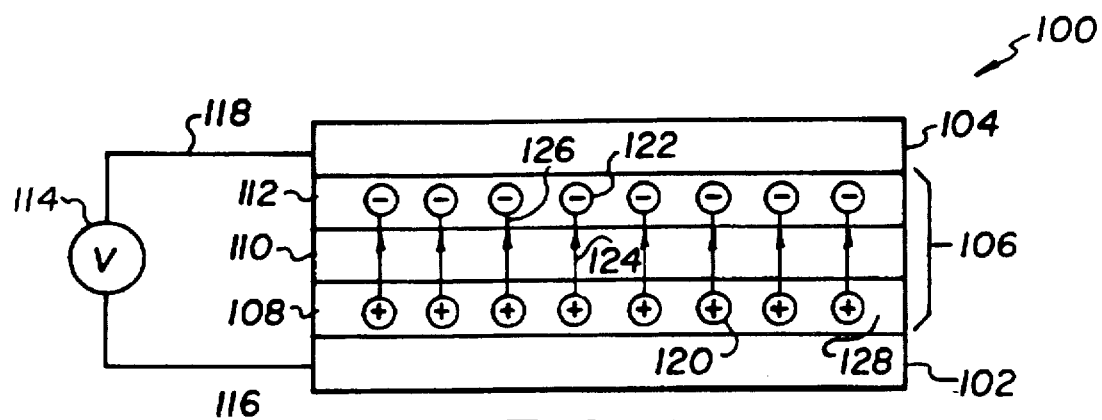
FIGS. 1, 2, and 3 are schematic diagrams of EL devices which can use the present invention.

An EL device 100 according to the invention is schematically illustrated in FIG. 1. Anode 102 is separated from cathode 104 by an organic luminescent medium 106, which, as shown, consists of three superimposed layers. Layer 108 located on the anode forms a hole injecting zone of the organic luminescent medium. Located above the hole injecting layer is layer 110, which forms a hole transporting zone of the organic luminescent medium. Interposed between the hole transporting layer and the cathode is layer 112, which forms an electron injecting and transporting zone of the organic luminescent medium. The anode and the cathode are connected to an external AC or DC power source 114 by conductors 116 and 118, respectively. The power source can be pulsed or continuous wave (CW).

The EL device can be viewed as a diode which is forward biased when the anode is at a higher potential than the cathode. Under these conditions injection of hole (positive charge carriers) occurs into the lower organic layer, as schematically shown at 120, while electrons are injected into the upper organic layer, as schematically shown at 122, into the luminescent medium. The injected holes and electrons each migrate toward the oppositely charged electrode, as shown by the arrows 124 and 126, respectively. This results in hole-electron recombination. When a migrating electron drops from its conduction potential to a valence band in filing a hole, energy is released as light. Hence the organic luminescent medium forms between the electrodes a luminescence zone receiving mobile charge carriers from each electrode. Depending upon the choice of alternative constructions, the released light can be emitted from the organic luminescent material through one or more edges 128 of the organic luminescent medium separating the electrodes, through the anode, through the cathode, or through any combination of the foregoing.

Since the organic luminescent medium is quite thin, it is usually preferred to emit light through one of the two electrodes. This is achieved by forming the electrodes as a translucent or transparent coating, either on the organic luminescent medium or on a separate translucent or transparent medium or on a separate translucent or transparent support. The thickness of the coating is determined by balancing light transmissions (or extinction) and electrical conductance (or resistance).

Figure 2:
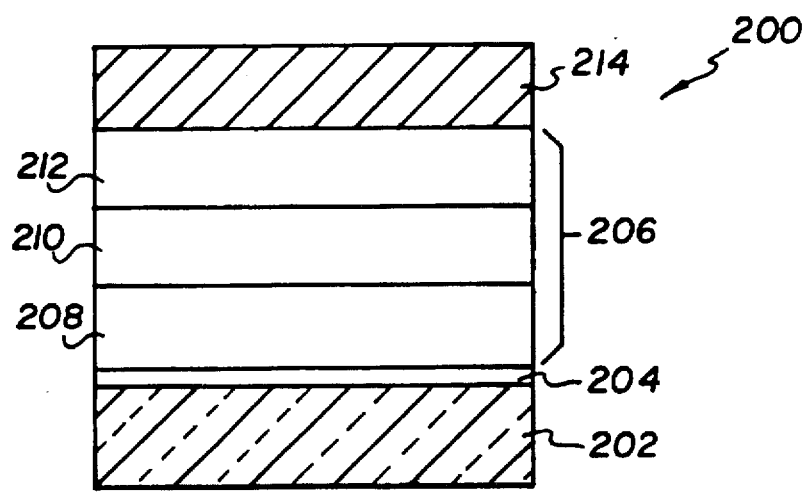

Organic EL device 200 shown in FIG. 2 is illustrative of one preferred embodiment of the invention. Because of the historical development of organic EL devices it is customary to employ a transparent anode. This is achieved by providing a transparent insulative support 202 such as glass onto which is deposited a conductive light transmissive relatively high work function metal or metal oxide layer to form anode 204. The organic luminescent medium 206 and therefore each of its layers 208, 210, and 212 correspond to the medium 106 and its layers 108, 110, and 112, respectively, and require no further description. With preferred choices of materials, described below, forming the organic luminescent medium the layer 212 is the zone in which luminescence occurs. The cathode 214 is conveniently formed by deposition on the upper layer of the organic luminescent medium.

Figure 3:
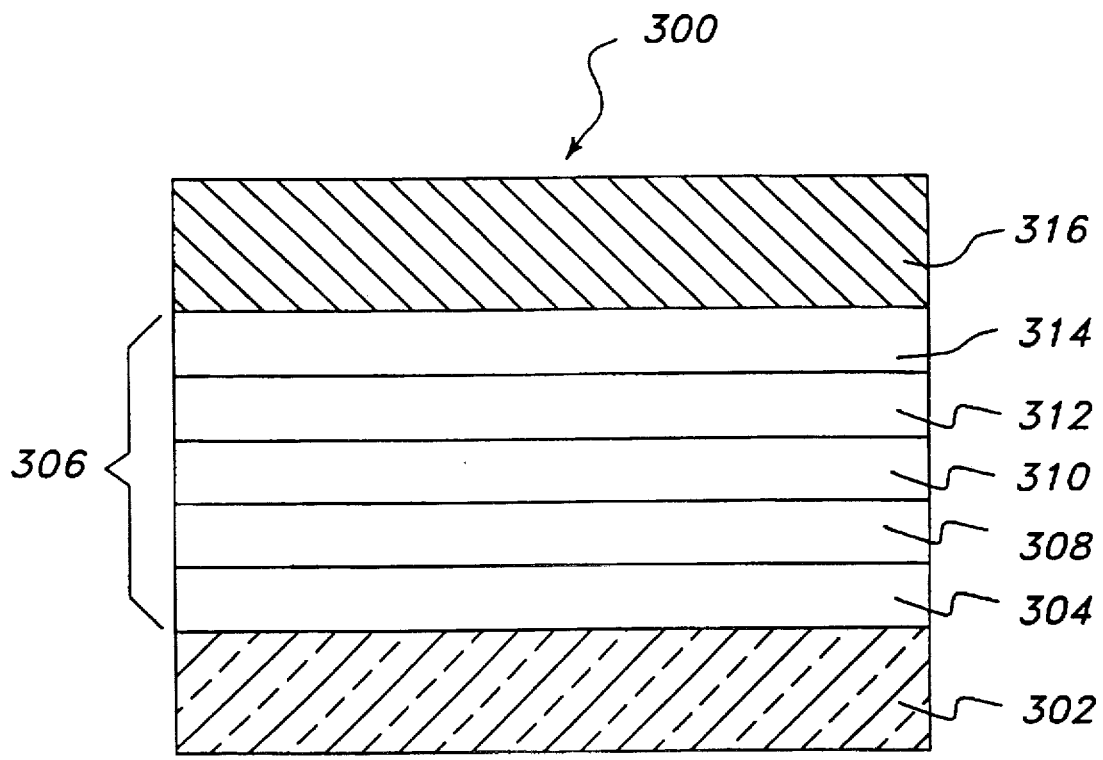

Organic EL device 300 shown in FIG. 3 is illustrative of yet another preferred embodiment of the invention. Thus, there is shown an organic EL device comprised of multilayers of organic thin films 306 sandwiched between anode 304 provided on a glass support 302 and cathode 316. On anode 304 is provided a hole-injecting layer 308 that is followed in sequence by a hole-transport layer 310, a doped luminescent layer 312 and an electron-transport layer 314. Doped luminescent layer 312 is primarily responsible for the spectral characteristics of the EL device.

In the practice of the present invention, the luminescent zone is in every instance formed by a thin film (herein employed to mean less than 1 μm in thickness) comprised of an organic host material capable of sustaining hole and electron injection and a fluorescent material capable of emitting light in response to hole-electron recombination. It is preferred that the luminescent zone be maintained in a thickness range of from 50 to 5000 Angstroms and, optimally, 100 to 1000 Angstroms, so that the entire organic luminescent medium can be less than 1 μm and preferably less than 1000 Angstroms in thickness.

The host material can be conveniently formed of any material heretofore employed as the active components of a thin film luminescent zone of an organic EL device. Among host materials suitable for use in forming thin films are diarylbutadienes and stilbenes, such as those disclosed by Tang U.S. Pat. No. 4,356,429, cited above.

The organic luminescent medium of the EL devices of this invention contains at least two separate organic layers, one layer forming the electron injecting and transporting zone of the device and one layer forming the hole injecting and transporting zone. The former also constitutes the electron-hole recombination and therefore the EL emissive layer.

Another preferred embodiment of the EL devices of this invention contains a minimum of three separate organic layers, at least one layer forming the electron injecting and transporting zone of the device, and one layer forming the fluorescent emitting layer, and at least one layer forming the hole injecting and transporting zone, where electron-hole recombination and therefore EL emission preferably takes place in the fluorescent emitting layer.

A layer containing a porphyrinic compound forms the hole injecting zone of the organic EL device. A porphyrinic compound is any compound, natural or synthetic, which is derived from or includes a porphyrin structure, including porphine itself. Any of the prophyrinic compounds disclosed by Adler, U.S. Pat. No. 3,935,031 or Tang U.S. Pat. No. 4,356,429, the disclosures of which are here incorporated by reference, can be employed.

Preferred porphyrinic compounds are those of structural formula (III):

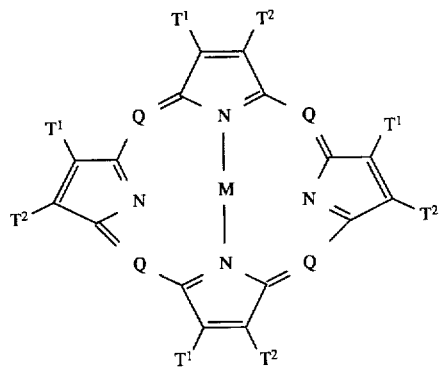

wherein

Q is —N= or —C(R)=;

M is a metal, metal oxide, or metal halide;

R is hydrogen, alkyl, aralkyl, aryl, or alkaryl; and $T^1$ and $T^2$ represent hydrogen or together complete a unsaturated six member ring, which can include substituents, such as alkyl or halogen. Preferred six membered rings are those formed of carbon, sulfur, and nitrogen ring atoms. Preferred alkyl moieties contain from about 1 to 6 carbon atoms while phenyl constitutes a preferred aryl moiety.

In an alternative preferred form the porphyrinic compounds differ from those of structural formula (I) by substitution of two hydrogens for the metal atom, as indicated by formula (IV):

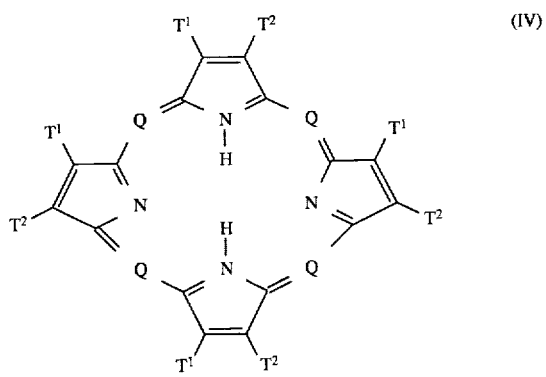

Highly preferred examples of useful porphyrinic compounds are metal free phthalocyanines and metal containing phthalocyanines. While the porphyrinic compounds in general and the phthalocyanines in particular can contain any meal, the metal preferably has a positive valence of two or higher. Exemplary preferred metals are cobalt, magnesium, zinc, palladium, nickel, and, particularly, copper, lead, and platinum.

Illustrative of useful porphyrinic compounds are the following:
  Prophine
  1,10,15,20-tetraphenyl-21H,23H-porphine copper (II)
  1,10,15,20-tetrapheyl-21H,23H-porphine zinc (II)
  Copper phthlocyanine
  Chromium phthalocyanine fluoride The hole transporting layer of the organic EL device contains at least one hole transporting aromatic tertiary amine, where the latter is understood to be a compound containing at least one trivalent nitrogen atom that is bonded only to carbon atoms, at least one of which is a member of an aromatic ring. In one form the aromatic tertiary amine can be an arylamine, such as a monarylamine, diarylamine, triarylamine, or a polymeric arylamine. Exemplary monomeric triarylamines are illustrated by Klupfel et al U.S. Pat. No. 3,180,730. Other suitable triarylamines substituted with vinyl or vinyl radicals and/or containing at least one active hydrogen containing group are disclosed by Brantley et al U.S. Pat. Nos. 3,567,450 and 3,658,520.

Another class of aromatic tertiary amines are those which include at least two aromatic tertiary amine moieties. Such compounds include those represented by structural formula (V).

wherein $Q^1$ and $Q^2$ are independently aromatic tertiary amine moieties and

G is a linking group such as an arylene, cycloalkylene, or alkylene group of a carbon to carbon bond.

A preferred class of triarylamines satisfying structural formula (V) and containing two triarylamine moieties are those satisfying structural formula (VI):

where

R₁ and R² each independently represents a hydrogen atom, an aryl group, or an alkyl group or R₁ and R² together represent the atoms completing a cycloalkyl group and R³ and R⁴ each independently represents an aryl group which is in turn substituted with a diaryl substituted amino group, as indicated by structural formula (VII):

(VII)

wherein R⁵ R⁶ are independently selected aryl groups.

Another preferred class of aromatic tertiary amines are tetraaryldiamines. Preferred tetraaryldiamines include two diarylamino groups, such as indicated by formula (VIII), linked through an arylene group:

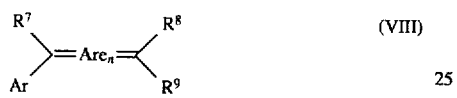

(VIII)

wherein

Are is an arylene group, n is an integer of from 1 to 4, and

Ar, R⁷, R⁸, and R⁹ are independently selected aryl groups.

The various alkyl, alkylene, aryl, and arylene moieties of the foregoing structural formulae (V), (VI), (VIII), can each in turn be substituted. Typical substituents including alkyl groups, alkoxy groups, aryl groups, aryloxy groups, and halogen such as fluoride, chloride, and bromide. The various alkyl and alkylene moieties typically contain from about 1 to 6 carbon atoms. The cycloalkyl moieties can contain from 3 to about 10 carbon atoms, but typically contain five, six, or seven ring carbon atoms-e.g., cyclopentyl, cyclohexyl, and cycloheptyl ring structures. The aryl and arylene moieties are preferably phenyl and phenylene moieties.

Illustrative of useful hole transport compounds are the following:

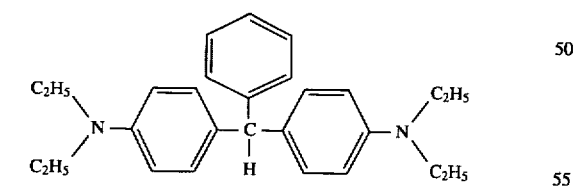

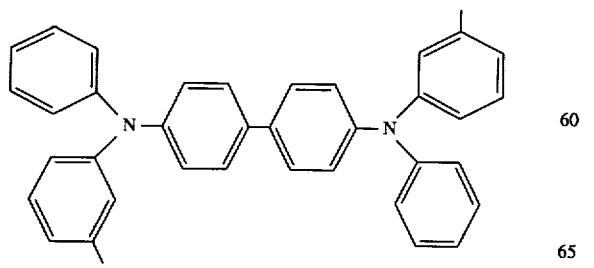

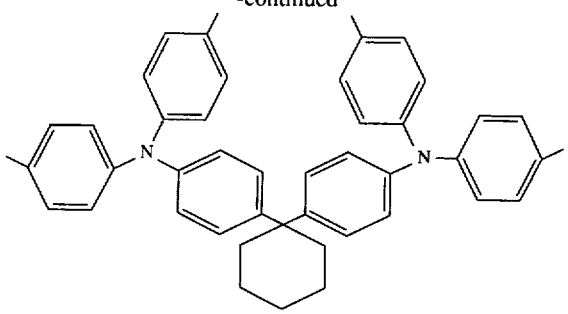

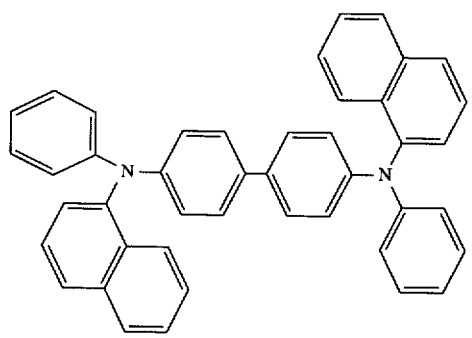

In the practice of the present invention, the luminescent zone is in every instance formed by a thin film (herein employed to mean less than 1 μm in thickness) comprised of an organic host material capable of sustaining hole and electron injection and a fluorescent material capable of emitting light in response to hole-electron recombination. It is preferred that the luminescent zone be maintained in a thickness range of from 50 to 5000 Angstroms and, optimally, 100 to 1000 Angstroms, so that the entire organic luminescent medium can be less than 1 μm and preferably less than 1000 Angstroms in thickness.

The host material can be conveniently formed of any material heretofore employed as the active components of a thin film luminescent zone of an organic EL device. Among host materials suitable for use in forming thin films are diarylbutadienes and stilbenes, such as those disclosed by Tang U.S. Pat. No. 4,356,429, cited above.

Still other thin film forming host materials which can be employed are optical brighteners, particularly those disclosed by Van Slyke et al U.S. Pat. No. 4,539,507, cited above and here incorporated by reference. Useful optical brighteners include those satisfying structural formulae (I) and (II):

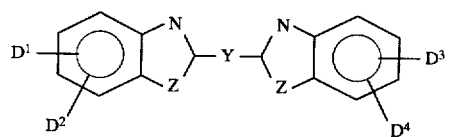

or

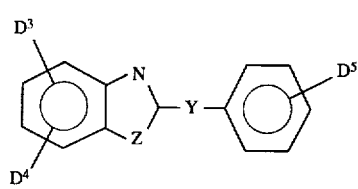

wherein:

$D^1$, $D^2$, $D^3$, and $D^4$ are individually hydrogen; saturated aliphatic of from 1 to 10 carbon atoms, for example, propyl, t-butyl, heptyl, and the like; aryl of from 6 to 10 carbon atoms, for example, phenyl and naphthyl; or halo such as chloro, fluoro, and the like; or $D^1$ and $D^2$ or $D^3$ and $D^4$ taken together comprise the atoms necessary to complete a fused aromatic ring optionally bearing at least one saturated aliphatic of from 1 to 10 carbon atoms, such as methyl, ethyl, propyl and the like;

$D^5$ is a saturated aliphatic of from 1 to 20 carbon atoms, such as methyl, ethyl, n-eicosyl, and the like; aryl of from 6 to 10 carbon atoms, for example, phenyl and naphthyl; carboxyl; hydrogen; cyano; or halo, for example, chloro, fluoro and the like; provided that in formula (II) at least two of $D^3$, $D^4$ and $D^5$ are saturated aliphatic of from 3 to 10 carbon atoms, e.g., propyl, butyl, heptyl and the like;

Z is —O—, —N($D^6$)—, or —S—; and

Y is

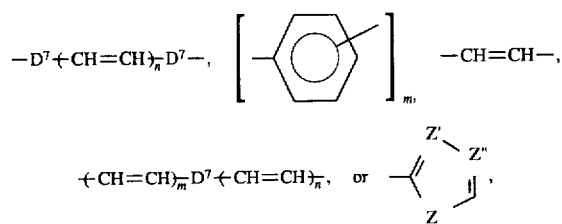

wherein:

m is an integer of from 0 to 4;

n is arylene of from 6 to 10 carbon atoms, for example, phenylene and naphthylene; and $D^6$ is hydrogen; a saturated aliphatic substituent of from 1 to 10 carbon atoms, such as an alkyl substituent; aryl of from 6 to 10 carbon atoms, such as phenyl or naphthyl; or a halo substituent, such as chloro or fluoro;

$D^7$ is arylene of from 6 to 10 carbon atoms, such as phenyl or naphthyl;

Z' and Z" are individually N or CH.

As used herein, "aliphatic" includes substituted aliphatic as well as unsubstituted aliphatic. The substituents in the case of substituted aliphatic include alkyl of from 1 to 5 carbon atoms, for example, methyl, ethyl, propyl and the like; aryl of from 6 to 10 carbon atoms, for example, phenyl and naphthyl; halo, such as chloro, fluoro and the like; nitro; and alkoxy having 1 to 5 carbon atoms, for example, methoxy, ethoxy, propoxy, and the like.

Still other optical brighteners that are contemplated to be useful are listed in Vol. 5 of *Chemistry of Synthetic Dyes*, 1971, pages 618–637 and 640. Those that are not already thin-film-forming can be rendered so by attaching an aliphatic moiety to one or both end rings.

Particularly preferred host materials for forming the luminescent zone of the organic EL devices of this invention are metal chelated oxinoid compounds, including chelates of oxine (also commonly referred to as 8-quinolinol or 8-hydroxyquinoline). Such compounds exhibit both high levels of performance and are readily fabricated in the form of thin films.

Illustrative of useful host materials including metalized oxines capable of being used to form thin films are the following:

Aluminum trisoxine [a.k.a., tris(8-quinolinol) aluminum, Alq].

Magnesium bisoxine [a.k.a., bis(8-quinolinol)magnesium]

Bis[benzo{f}-8-quinolinol]zinc

Bis(2-methyl-8-quinolinolato) aluminum oxide

Indium trisoxine {a.k.a., tris(8-quinolinol)indium]

Aluminum tris(5-methyloxine) [a.k.a., tris(5-methyl-8-quinolinol)aluminum]

Lithium oxine [a.k.a., 8-quinolinol lithium]

Gallium trisoxine [a.k.a., tris(5-chloro-8-quinolinol)gallium]

Calcium bis(5-chlorooxine)[a.k.a., bis(5-chloro-8-quinolinol)calcium]

Poly[zinc(II)-bis-(8-hydroxy-5-quinolin-yl)methane]

Dilithium epindolidione 1,4-Diphenylbutadiene 1,1,4,4-Tetraphenylbutadiene 4,4'-Bis[5,7-di(t-pentyl-2-benzoxazolyl]stilbene 2,5-Bis[5,7-di(t-pentyl-2-benzoxazolyl]thiophene 2,2'-(1,4-phenylenedivinylene)bisbenzothiazole 4,4'-(2,2'-Bisthiazolyl)biphenyl 2,5-Bis[5-($\alpha,\alpha$-dimethylbenzyl)-2-benzoxazolyl]thiophene 2,5-Bis[5,7-di(t-pentyl)-2-benzoxazolyl]-3,4-diphenylthiophene Trans-stilbene All of the host materials listed above are known to emit light in response to hole and electron injection. By blending with the host material a minor amount of a fluorescent material capable of emitting light in response to hole-electron recombination, the hue light emitted from the luminescent zone can be modified. In theory, if a host material and a fluorescent material could be found for blending which have exactly the same affinity for hole-electron recombination, each material should emit light upon injection of holes and electrons in the luminescent zone. The perceived hue of light emission Would be the visual integration of both emissions.

Since imposing such a balance of host and fluorescent materials is highly limiting, it is preferred to choose the fluorescent material so that it provides the favored sites for light emission. When only a small proportion of fluorescent material providing favored sites for light emission is present, peak intensity wavelength emissions typical of the host material can be entirely eliminated in favor of a new peak intensity wavelength emission attributable to the fluorescent material. While the minimum proportion of fluorescent material sufficient to achieve this effect varies by the specific choice of host and fluorescent materials, in no instance is it necessary to employ more than about 10 mole percent fluorescent material, based on moles of host material and seldom is it necessary to employ more than 1 mole percent of the fluorescent material. On the other hand, for any host material capable of emitting light in the absence of fluorescent material, limiting the fluorescent material present to extremely small amounts, typically less than about $10^{-3}$ mole percent, based on host material, can result in retaining emission at wavelengths characteristic of the host material. Thus, by choosing the proportion of a fluorescent material capable of providing favored sites for light emission, either a full or partial shifting of emission wavelengths can be realized. This allows the spectral emissions of the EL devices of this invention to be selected and balanced to suit the application to be served.

Choosing fluorescent materials capable of providing favored sites for light emission necessarily involves relating the properties of the fluorescent material to those of the host material. The host material can be viewed as a collector for injected holes and electrons with the fluorescent material providing the molecular sites for light emission. One important relationship for choosing a fluorescent material capable of modifying the hue of light emission when present in a host material is a comparison of the reduction potentials of the two materials. The fluorescent materials demonstrated to shift the wavelength of light emission have exhibited a less negative reduction potential than that of the host material. Reduction potentials, measured in electron volts, have been widely reported in the literature along with varied techniques for their measurement. Since it is a comparison of reduction potentials rather than their absolute values which is desired, it is apparent that any accepted technique for reduction potential measurement can be employed, provided both the fluorescent and host material reduction potentials are similarly measured. A preferred oxidation and reduction potential measurement techniques is reported by R. J. Cox, *Photographic Sensitivity*, Academic Press, 1973, Chapter 15.

A second important relationship for choosing a fluorescent material capable of modifying the hue of light emission when present in a host material is a comparison of the bandgap potentials of the two materials. The fluorescent materials demonstrated to shift the wavelength of light emission have exhibited a lower bandgap potential than that of the host material. The bandgap potential of a molecule is taken as the potential difference in electron volts (eV) separating its ground state and first single state. Bandgap potentials and techniques for their measurement have been widely reported in the literature. The bandgap potentials herein reported are those measured in electron volts (eV) at an absorption wavelength which is bathochromic to the absorption peak and of a magnitude one tenth that of the magnitude of the absorption peak. Since it is a comparison of bandgap potentials rather than their absolute values which is desired, it is apparent that any accepted technique for bandgap measurement can be employed, provided both the fluorescent and host material band gaps are similarly measured. One illustrative measurement technique is disclosed by F. Gutman and L. E. Lyons, *Organic Semiconductors*, Wiley, 1967, Chapter 5.

Where a host material is chosen which is itself capable of emitting light in the absence of the fluorescent material, it has been observed that suppression of light emission at the wavelengths of emission characteristics of the host material alone and enhancement of emission at wavelengths characteristic of the fluorescent material occurs when spectral coupling of the host and fluorescent materials is achieved. By spectral coupling it is meant that an overlap exists between the wavelengths of emission characteristic of the host material alone and the wavelengths of light absorption of the fluorescent material in the absence of the host material. Optimal spectral coupling occurs when the maximum emission of the host material alone substantially matches within ±25 nm the maximum absorption of the fluorescent material alone. In practice, advantageous spectral coupling can occur with peak emission and absorption wavelengths differing by up to 100 nm or more, depending on the width of the peaks and their hypsochromic and bathochromic slopes. Where less than optimum spectral coupling between the host and fluorescent materials is contemplated, a bathochromic as compared to a hypsochromic displacement of the fluorescent material produces more efficient results.

Although the foregoing discussion has been undertaken by reference to host materials which are known to themselves emit light in response to hole and electron injection, in fact light emission by the host material itself can entirely cease where light emission by the fluorescent material is favored by any one or combination of the various relationships noted above. It is appreciated that shifting the role of light emission to the fluorescent material allows a still broader range of choices of host materials. For example, one fundamental requirement of a material chosen to emit light is that it must exhibit a low extinction coefficient for light of the wavelength it emits to avoid internal absorption. The present invention permits use of host materials which are capable of sustaining the injection of holes and electrons, but are themselves incapable of efficiently emitting light.

Useful fluorescent materials are those capable of being blended with the host material and fabricated into thin films satisfying the thickness ranges described above forming the luminescent zones of the EL devices of this invention. While fluorescent materials do not necessarily lend themselves to thin film formation, the limited amounts of these fluorescent materials present in the host materials permits the use of these fluorescent materials which are alone incapable of thin film formation. Preferred fluorescent materials are those which form a common phase with the host material. Although any convenient technique for dispersing the fluorescent materials in the host materials can be undertaken, preferred fluorescent materials are those which can be vacuum vapor deposited along with the host materials.

The quinacridone compounds disclosed in this invention belong to a class of pigments which are widely used as stable colorants in paints, textiles and automotive industries because of their thermal stability and light fastness. For More detailed description of their uses, properties, and preparation methods can be found in Pigment Handbook, edited by Peter A. Lewis, Volume 1, John Wiley & Sons, page 601, The use of quinacridone compounds in EL devices have been previously disclosed in U.S. Pat. No. 5,227,252. It was found that when the quinacridone compound is dispersed in a host EL material such Alq by vacuum deposition, the fluorescent efficiency of the resulting mixture is significantly higher than the host Alq material alone. Correspondingly the EL efficiency of the mixture is greatly improved. It should be noted that the quinacridone materials disclosed in the above-cited patent specificially refers to compounds of structural formula (I):

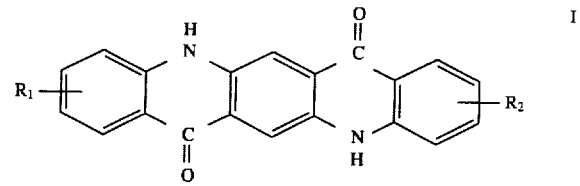

where $R_1$ and $R_2$ are independently hydrogen, methyl group or chlorine or the dehydro form the the quinacridone compound.

Although the quinacridones are known to be highly stable for colorant applications, and are useful in EL application in improving the efficiency, it is not obvious in the latter application that the quinacridones would have operational stability as well. In particular, it is noted that the quinacridones of molecular formula (I) have N—H moeities which are capable of forming unstable hydrogen bonds with neigbouring molecules processing carbonyls or other groups. Such an inter-molecular coordination would produce dimers or excited state dimers between adjacent quinacridone molecules which are undesirable for EL operation.

Thus, it is anticipated that a modification of the quinacridone structure is necessary to provide, for EL operation, both improved efficiency and stability. The present invention discloses a substituted quinacridone structure of molecular formula (II):

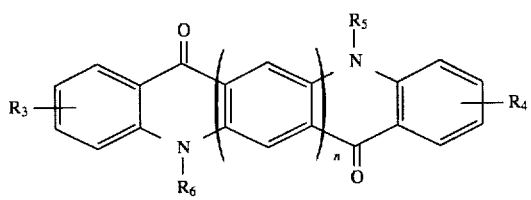

where $R_3$ and $R_4$ are independently alkyl, alkoxyl, aryl, fused aryl or halogen; and $R_5$ and $R_6$ are independently alkyl, alkoxyl, aryl, or substituted aryl; and n=0, 1, 2 or 3.

The substituents $R_5$ and $R_6$ are specifically designed to block the possibility of hydrogen bonding in this quinacridone structure and its degradative effect on EL operation. Also by extending the chromophores (n=2 or 3) or shortening the chromophore (n=0), these substituted quinacridone compounds are expected to be useful as fluorescent materials for EL devices emitting lights of different wavelengths.

A preferred thin film forming materials for use in forming the electron injecting and transporting layers of the organic EL devices of this invention is metal chelated oxinoid compounds, including chelates of oxine itself (also commonly referred to as 8-quinolinol or 8-hydroxyquinoline). Such compounds exhibit both high levels of performance and are readily fabricated in the form of thin films. Exemplary of contemplated oxinoid compounds are those satisfying structural formula (IX).

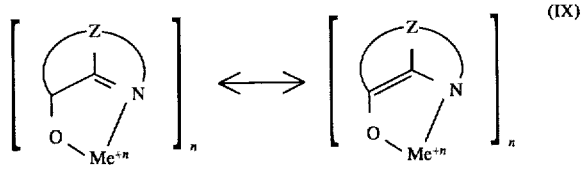

wherein

Me represents a metal;

n is an integer of from 1 to 3; and

Z independently in each occurrence represents the atoms completing a nucleus having at least two fused aromatic rings.

From the foregoing it is apparent that the metal can be monovalent, divalent, or trivalent metal. The metal can, for example, be an alkali metal, such as lithium, sodium, or potassium; an alkaline earth metal, such as magnesium or calcium; or an earth metal, such as boron or aluminum. Generally any monovalent, divalent, or trivalent metal known to be a useful chelating metal can be employed.

Z completes a heterocyclic nucleus containing at least two fused aromatic rings, at least one of which is an azole or azine ring. Additional rings, including both aliphatic and aromatic rings, can be fused with the two required rings, if required. To avoid adding molecular bulk without improving on function the number of ring atoms is preferably maintained at 18 or less.

Illustrative of useful chelated oxinoid compounds are the following:
Aluminum trisoxine [a.k.a, tris(8-quinolinol)aluminum]
Magnesium bisoxine [a.k.a. bis(8-quinolinol)-magnesium]
Indium trisoxine [a.k.a., tris(8-quinolinol)indium]
Lithum oxine (a.k.a., 8-quinolinol lithium)

In the organic EL devices of the invention, it is possible to maintain a current density compatible with efficient light emission while employing a relatively low voltage across the electrodes by limiting the total thickness of the organic luminescent medium to less than 10,000 Angstroms. At a thickness of less than 1 mm an applied voltage of 20 volts results in a field potential of greater than $2 \times 10^5$ volts/cm, which is compatible with efficient light emission. An order of magnitude reduction to 100 Angstroms in thickness of the organic luminescent medium, allowing further reductions in applied voltage and/or increase in the field potential and hence current density, are well within device construction capabilities.

The preferred materials for forming the organic luminescent medium are each capable of fabrication in the form of a thin film—that is, capable of being fabricated as a continuous layer having a thickness of less than 5000 Angstroms. A preferred method for forming the organic luminescent medium is by vacuum vapor deposition. Extremely thin defect free continuous layers can be formed by this method. Specifically, individual layer thicknesses as low as about 50 Angstroms can be constructed while still realizing satisfactory EL device performance. Employing a vacuum vapor deposited porphorinic compound as a hole injecting layer, a film forming aromatic tertiary amine as a hole transporting layer (which can in turn be comprised of a triarylamine layer and a tetraaryldiamine layer), a fluorescent emitting layer comprised of a mixture of a host material and a fluorescent compound, and a chelated oxinoid compound as an electron injecting and transporting layer, individual layer thicknesses in the range of from about 50 to 5000 Angstroms are contemplated, with layer thicknesses in the range of from 100 to 2000 Angstroms being preferred. It is generally preferred that the overall thickness of the organic luminescent medium be at least about 1000 Angstroms.

The anode and cathode of the organic EL device can each take any convenient conventional form. Where it is intended to transmit light from the organic EL device through the anode, this can be conveniently achieved by coating a thin conductive layer onto a light transmissive substrate—e.g., a transparent or substantially transparent glass plate or plastic film. In one form the organic EL devices of this invention can follow the historical practice of including a light transmissive anode formed of tin oxide or indium tin oxide coated on a glass plate, as disclosed by Gurnee et al U.S. Pat. No. 3,172,862, Gurnee U.S. Pat. No. 3,173,050, Dresner "Double Injection Electroluminescence in Anthracene", *RCA Review*, Volume 30, pages 322–334, 1969; and Dresner U.S. Pat. No. 3,710,167 cited above.

The organic EL devices of this invention can employ a cathode constructed of any metal, including any high or low work function metal, heretofore taught to be useful for this purpose. Unexpected fabrication, performance, and stability advantages have been realized by forming the cathode of a combination of a low work function metal and at least one other metal. For further disclosure, see U.S. Pat. No. 4,885,211 by Tang and VanSlyke, the disclosure of which is incorporated by reference herein.

EXAMPLES

The invention and its advantages are further illustrated by the specific examples which follow.

SYNTHESIS

Example 1

Synthesis of N,N'-dimethylquinacrydone

To a suspension of quinacridone (31.2 g, 0.1 mol) in 500 mL of dry tetrahydrofuran (THF) was slowly added 80% sodium hydride (20.0 g, 0.67 mol) under nitrogen. The mixture was heated to reflux for two hours then 100 mL of methyl iodide was added. The reaction mixture was continued to heat to reflex for overnight. After distilling off excess of methyl iodide, methanol (300 mL) was slowly added to the reaction mixture. The resulted suspension was stirred for two hours. The generated red precipitates were filtered and washed with methanol. After drying, the crude N,N'-dimethylquinacridone (33.0 g) was obtained in 97% yield. The pure N,N'-dimethylquinacridone (which can be used directly for cell fabrication) was obtained by sublimation at 285° C. and 2 Torr.

Using a similar procedure, the following acridone compounds have been made with good yields.

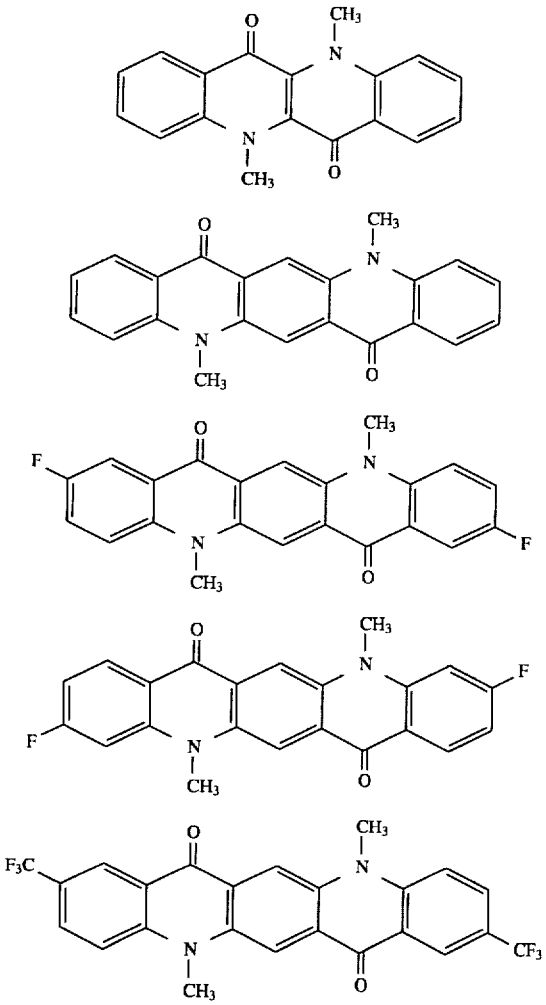

EL DEVICE FABRICATION AND PERFORMANCE

Example 2

Fabrication Procedure

An EL device satisfying the requirements of the invention was constructed in the following manner. The device structure has a four organic-layer stack, namely hole-injecting layer, hole transporting layer, fluorescent emitting layer, electron-transporting layer.

a) An indium-tin-oxide coated glass substrate was sequentially ultrasonicated in a commercial detergent, rinsed in deionized water, degreased in toluene vapor and exposed to ultraviolet light and ozone for a few minutes.

b) A hole injecting layer of copper phthalocyanine (150 Angstroms) was then deposited on top of the ITO coated substrate by evaporation from a tantalum boat.

c) Onto the copper phthalocyanine layer was deposited a hole transporting layer of N,N'-BIS-(1-Naphthyl)-N,N'-Diphenylbenzidine, also evaporated from a tantalum boat.

d) A fluorescent emitting layer of Alq (400 Angstroms) doped with a quinacridone compound was then deposited onto the hole transporting layer. This mixed layer was prepared by co-depositing the two materials from separate tantalum boats. The rates were independently controlled. The typical rate for Alq was 5 Angstroms per second, and the rate for the quinacridone was adjusted according to the concentration desired.

e) A electron transporting layer of Alq (400 Angstroms) was then deposited onto the fluorescent emitting layer.

f) On top of the Alq layer was deposited a 2000 cathode formed of a 10:1 atomic ratio of Mg and Ag.

The above sequence completed the deposition of the EL device. The device was then hermetically parckaged in a dry glove box for protection against ambient environment.

Example 3

EL Devices with N,N Dimethyl Quinacridone Doped Alq Fluorescent Emitter Layer The EL devices were fabricated according to the procedure of Example 2. The fluorescent emitting layer was Alq doped with various concentration of N,N'-dimethylquinacridone. Table 1 lists the luminance quantum efficiency measured in unit of candela per ampere, and CIE color coordinates and the luminance output under a constant current bias of 20 mA/cm^2.

TABLE 1

Luminance Performance of EL devices with N,N'-dimethylquinacridone doped Alq fluorescent emitting layer

| EL Parameters | Concentration of dopant in Alq host | | | | |
|---|---|---|---|---|---|
| Dopant concentration | 0% | 0.26% | 0.80% | 1.40% | 2.50% |
| Luminance (Cd/M^2) | 518 | 1147 | 1462 | 1287 | 1027 |
| CIE-x | 0.385 | 0.387 | 0.392 | 0.404 | 0.409 |
| CIE-y | 0.546 | 0.586 | 0.590 | 0.580 | 0.574 |
| Luminance Eff. (cd/A) | 2.59 | 5.736 | 7.31 | 6.435 | 5.135 |

Example 4

Operational Stability of EL devices with N,N Dimethyl Quinacridone Doped Alq Fluorescent Emitter Layer The operational stability of the El device was tested under an AC bias condition with a time averaged forward bias current density of 20 mA/cm^2. The AC waveform was square and the frequency was 1 kHz. In the forward bias cycle, a constant current was impressed upon the device; in the reverse cycle, a constant voltage of 14 volts.

Table 2 summarizes the stability performance of the set of EL devices of Example 2. This table lists the relative luminance level of the EL devices at various time intervals. The absolute luminance at initial times is listed in Table 1.

TABLE 2

Lumiance Performance of EL devices with
N,N'-dimethylquinacridone doped Alq fluorescent emitting layer

| | Concentration of dopant in Alq host | | | | |
|---|---|---|---|---|---|
| Time (Hrs) | 0% | 0.26% | 0.80% | 1.40% | 2.50% |
| | Relative EL luminance | | | | |
| 0 | 100 | 100 | 100 | 100 | 100 |
| 300 | 96.9 | 96.5 | 95.0 | 92.9 | 87.8 |
| 500 | 93.0 | 93.3 | 92.3 | 88.9 | 85.0 |
| 800 | 84.2 | 88.4 | 88.3 | 85.2 | 78.7 |
| 1000 | 82.7 | 86.5 | 85.5 | 79.9 | 73.1 |
| 1500 | 75.2 | 82.2 | 78.2 | 73.2 | 74.3 |
| 2000 | 69.3 | 76.8 | 74.9 | 70.4 | 64.3 |

Example 5

EL Devices with Unsubstituted Quinacridone Doped Alq Fluorescent Emitter Layer The EL devices were fabricated according to the procedure of Example 2. The fluorescent emitting layer was Alq doped with various concentration of quinacridone. Table 3 lists the luminance quantum efficiency measured in unit of candela per ampere, and CIE color coordinates and the luminance output under a constant current bias of 20 mA/cm^2.

TABLE 3

Luminance Performance of EL devices with unsubstituted
quinacridone doped Alq fluorescent emitting layer

| EL Parameters | Concentration of dopant in Alq host | | | | |
|---|---|---|---|---|---|
| Dopant concentration | 0% | 0.20% | 0.40% | 0.80% | 1.40% |
| Luminance (Cd/M^2) | 558 | 1180 | 1205 | 1657 | 1494 |
| CIE-x | 0.344 | 0.367 | 0.403 | 0.386 | 0.395 |
| CIE-y | 0.556 | 0.590 | 0.580 | 0.593 | 0.593 |
| Luminance Eff. (cd/A) | 2.79 | 5.90 | 7.31 | 8.285 | 7.47 |

Example 6

Operational Stability of EL Devices with Unsubstituted Quinacridone Doped Alq Fluorescent Emitter Layer The operational stability of the El device was tested under an AC bias condition with a time averaged forward bias current density of 20 mA/cm^2. The AC waveform was square and the frequency was 1 kHz. In the forward bias cycle, a constant current was impressed upon the device; in the reverse cycle, a constant voltage of 14 volts.

Table 4 summarizes the stability performance of the set of EL devices of Example 5. The table lists the relative luminance level of the EL devices at various time intervals. The absolute luminance at initial times islisted in Table 3.

TABLE 4

Lumiance Performance of EL devices with with unsubstituted
quinacridone doped Alq fluorescent emitting layer

| | Concentration of dopant in Alq host | | | | |
|---|---|---|---|---|---|
| Time (Hrs) | 0% | 0.20% | 0.40% | 0.80% | 1.40% |
| | Relative EL luminance | | | | |
| 0 | 100 | 100 | 100 | 100 | 100 |
| 100 | 97.6 | 82.4 | 74.6 | 72.9 | 64.7 |
| 200 | 96.0 | 76.1 | 66.5 | 64.8 | 55.4 |
| 300 | 92.5 | 70.4 | 61.3 | 56.8 | 50.0 |
| 500 | 87.1 | 62.1 | 52.8 | 48.3 | 41.4 |

Comparing the stability data of N,N'-dimethylquinacridone and the unsubstituted quinacridone of Examples 4 and 6, it is apparent that the EL device having the N,N'-dimethylquinacridone doped Alq fluorescent emitting layer is superior. It is particularly important to note from these data that the rate of the EL luminance decay for the quinacridone doped device increases rapidly with the quinacridone dopant concentration, signaling an intrinsic instability of the quinacridone material. Whereas for the N,N'-dimethylquinacridone doped device, this decay rate is relatively independent of dopant concentration and in fact decreases somewhat at the low concentration levels. This stability behavior indicates that the N,N'-dimethylquinacridone is an excellent dopant for EL devices providing both efficiency and stability improvement.

The invention has been described in detail with particular reference to certain preferred embodiments thereof, but it will be understood that variations and modifications can be effected within the spirit and scope of the invention.

PARTS LIST

100 EL Device
102 Anode
104 Cathode
106 Organic luminescent medium
108 Superimposed layer
110 Superimposed layer
112 Superimposed layer
114 External power source
116 Conductor
118 Conductor
120 Lower organic layer
122 Upper organic layer
124 Holes
126 Electrons
128 Edges
200 Electroluminescent device
202 Transparent insulative support
204 Anode
206 Organic luminescent medium
208 Layer
210 Layer
212 Layer
214 Cathode
300 Electroluminescent device
302 Transparent insulator support
304 Anode
306 Organic luminescent medium
308 Layer
310 Layer
312 Layer 314 Layer
316 Cathode

What is claimed is:

1. An organic EL device comprising an anode and a cathode, and an organic EL element disposed between the anode and cathode;

characterized in that the organic EL element has at least one fluorescent emitting layer containing a mixture of two or more materials;

the mixture contains a compound of the formula:

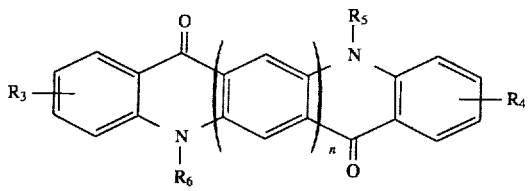

where $R_3$ and $R_4$ are independently alkyl, alkoxyl, substituted alkyl, aryl, fused aryl halogen; and $R_5$ and $R_6$ are independently alkyl, alkoxyl, substituted alkyl, aryl, or substituted aryl; and n=0, 1, 2 or 3.

2. An organic EL device according to claim 1 in which said mixture contains a metal complex of the formula:

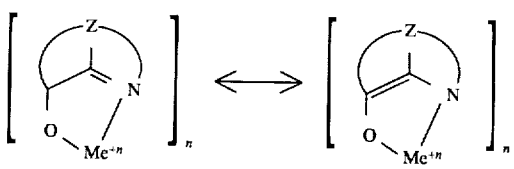

wherein

Me represents a metal;

n is an integer of from 1 to 3; and

Z independently in each occurrence represents the atoms completing a nucleus having at least two fused aromatic rings.

3. An organic EL device according to claim 1 in which $R_5$ and $R_6$ are methyl, ethyl, or phenyl.

4. An organic EL device according to claim 1 in which $R_3$ and $R_4$ are hydrogen, and $R_5$ and $R_6$ are methyl or tertiary buytl.

5. An organic EL device according to claim 1 in which the said mixture contains Alq.

* * * * *